US007472355B2

(12) United States Patent
Hockett et al.

(10) Patent No.: US 7,472,355 B2
(45) Date of Patent: Dec. 30, 2008

(54) COMPUTER-IMPLEMENTED METHOD FOR MANAGING COMMANDS FOR A TERMINAL SESSION

(75) Inventors: Hugh E. Hockett, Raleigh, NC (US); Adam M. Gunther, Raleigh, NC (US); Eric Kirchstein, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/171,972

(22) Filed: Jun. 30, 2005

(65) Prior Publication Data

US 2007/0005811 A1    Jan. 4, 2007

(51) Int. Cl.
*G06F 3/048* (2006.01)

(52) U.S. Cl. .................. 715/810; 715/965; 715/966

(58) Field of Classification Search .................. None
See application file for complete search history.

(56) References Cited

U.S. PATENT DOCUMENTS

| | | | | |
|---|---|---|---|---|
| 4,772,882 | A | | 9/1988 | Mical |
| 5,805,167 | A | | 9/1998 | van Cruyningen |
| 5,867,163 | A | * | 2/1999 | Kurtenbach .................. 715/840 |
| 6,003,143 | A | * | 12/1999 | Kim et al. .................... 714/38 |
| 6,043,816 | A | * | 3/2000 | Williams et al. ............. 715/783 |
| 6,052,456 | A | * | 4/2000 | Huang ................... 379/201.04 |
| 6,529,938 | B1 | * | 3/2003 | Cochran et al. .............. 709/203 |
| 2001/0044839 | A1 | * | 11/2001 | Bourke-Dunphy et al. .. 709/222 |
| 2003/0079206 | A1 | * | 4/2003 | Bates et al. .................. 717/129 |

FOREIGN PATENT DOCUMENTS

| | | |
|---|---|---|
| JP | 01250164 A2 | 10/1989 |
| JP | 06236335 A2 | 8/1994 |
| JP | 07-191792 | 7/1995 |

OTHER PUBLICATIONS

IBM Technical Disclosure Bulletin, "Programmable Function Keys", vol. 28, No. 6, Nov. 1985, pp. 2725-2726.

* cited by examiner

*Primary Examiner*—Doug Hutton
*Assistant Examiner*—Soumya Dasgupta
(74) *Attorney, Agent, or Firm*—Jerry W. Herndon; Hoffman Warnick LLC

(57) ABSTRACT

The present invention provides a computer-implemented method for managing commands for a terminal session. Specifically, using the graphical user interface of the present invention, a user can select a terminal session, and input one or more commands. Upon being input, a command is automatically send to the selected terminal session and added to a history or list of commands. Thus, the commands are "recorded" for potential future use upon being input. The commands are typically arranged in the list in a particular sequence, such as the order in which the commands were input. The user can individually send a command in the list to a terminal session, or the user can send a sequence of commands to the terminal session. In any event, results of executing the commands in the terminal session can be verified.

3 Claims, 4 Drawing Sheets

COMPUTER-IMPLEMENTED METHOD FOR MANAGING COMMANDS FOR A TERMINAL SESSION

BACKGROUND OF THE INVENTION

1. Field of the Invention

The present invention generally relates to management of commands for a terminal session. Specifically, the present invention provides a computer-implemented method, system, and interface for (visually) managing commands for a terminal session.

2. Related Art

When operating a terminal session, users frequently send the same commands or sequence of commands over and over again. There are several existing approaches for inputting commands, none of which provides a visual interface. For example, one existing approach requires users to type the same command multiple times by hand, which can take considerable time and effort. These efforts are further complicated when verification of a result of a command is required. Specifically, when a command is executed within a terminal session, a result or some other form of output is typically generated. Users often need to verify the results to ensure that the commands were properly executed. Similar to command input, result verification is a manual operation under existing approaches. Specifically, users will manually input a command, and then visually verify the desired result within the terminal session. These operations become even more complex if command input and result verification involve multiple terminal sessions. For example, a user might input a command for terminal session "A", but then look for a certain result in terminal session "B".

Another approach involves using macros, which are difficult to edit and provide no visual feedback for verifying results. Still yet another approach involves scripts that have many of the same limitations as macros. Currently, there is no visual mechanism for recording and/or sending commands (or command sequences) to a terminal session. To this extent, there is also currently no visual mechanism for verifying results of command executions. As such, there exists a need for an interface that can record and send commands (or command sequences) to a terminal session and verify any desired results.

SUMMARY OF THE INVENTION

In general, the present invention provides a computer-implemented method for (visually) managing commands for a terminal session. Specifically, using the graphical user interface of the present invention, a user can select a terminal session, and input one or more commands. Upon being input, a command is automatically sent to the selected terminal session and added to a history or list of commands. Thus, the commands are "recorded" for potential future use upon being input. The commands are typically arranged in the list in a particular sequence, such as the order in which the commands were input. The user can individually send a command in the list to a terminal session, or the user can send a sequence of commands to the terminal session. In the case of the latter, the interface of the present invention also includes break point indicators for setting/indicating breakpoints in the list of commands. When a breakpoint is indicated for a particular command, all commands in the list of commands leading up to the particular command (including the particular command) can be sent to the terminal session as a sequence. When the particular command is reached and sent, the breakpoint will cause the "send" operation to be terminated.

The interface of the present invention can also include other features such as session indicators for identifying the terminal session to which the commands in the list are sent; a verification field for identifying results to be verified in response to the sending and execution of the commands in the list to the terminal session; verification session fields for identifying other terminal sessions in which to verify the results; result indicators for indicating statuses of the verification of the results, and time out fields for indicating time out values for verifying the results.

A first aspect of the present invention provides a computer-implemented method for managing commands for a text-command driven terminal session, comprising: receiving a selection of the terminal session in an interface; receiving a text-based command for the terminal session in the interface; arranging the command in a list within the interface; receiving a breakpoint in the list, wherein the sending step comprises sending the plurality of commands to the terminal session in accordance with the sequence until the breakpoint is reached; indicating, in the interface, the breakpoint in the list; sending the command to the terminal session for execution; receiving, in the interface, a result to verify in response to the execution of the command in the terminal session; indicating, in the interface, whether the result is verified when the command is executed in the terminal session, wherein the indicating includes at least one of whether the verification was performed, whether the verification failed, whether no verification was performed, or whether the command was not sent; and setting a time out value for verifying the result.

Therefore, the present invention provides a computer-implemented method for managing commands for a terminal session.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a computer-implemented method, system, and interface for (visually) managing commands for a terminal session. Specifically, using the graphical user interface of the present invention, a user can select a terminal session, and input one or more commands. Upon being input, a command is automatically sent to the selected terminal session and added to a history or list of commands. Thus, the commands are "recorded" for potential future use upon being input. The commands are typically arranged in the list in a particular sequence, such as the order in which the commands were input. The user can individually send a command in the list to a terminal session, or the user can send a sequence of commands to the terminal session.

Figure 1:
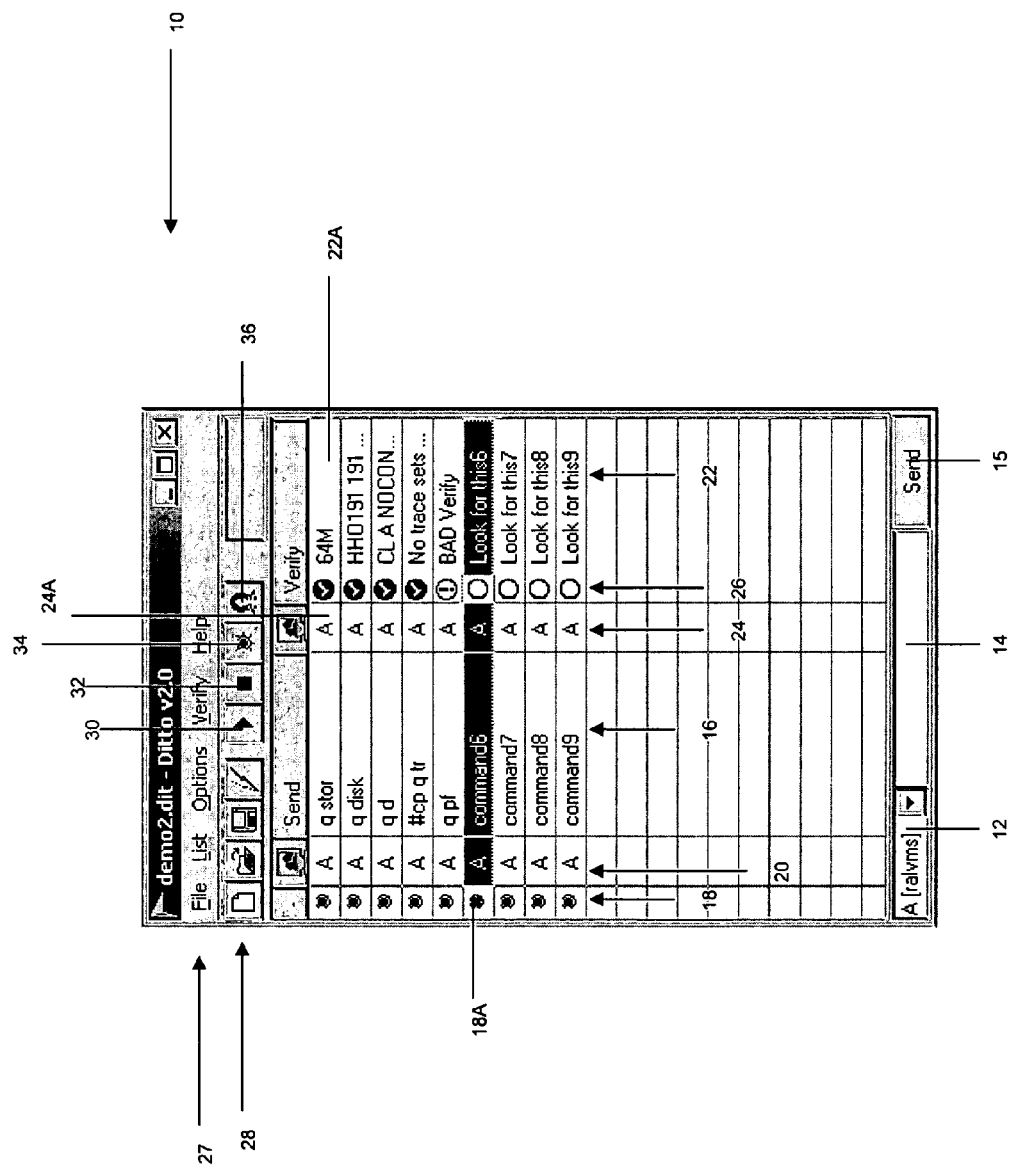
FIG. 1 shows an illustrative interface for visually managing commands for a terminal session according to the present invention.

Referring now to FIG. 1, a graphical user interface (hereinafter interface 10) for managing commands for a terminal session according to the present invention is shown. In general, interface 10 allows users to input and record commands or sequences of commands for use in a terminal session. Specifically, to direct one or more commands to a terminal session, a user will first select a terminal session using session selection mechanism 12. In one embodiment, session selection mechanism 12 can be a drop down menu (as shown) in which the available or open terminal sessions are listed. The user can then use an input device such as a mouse to select the terminal session to which he/she wishes to send a command. It should be understood that any other mechanism in which a terminal session can be selected or otherwise identified could be implemented within interface 10. For example, in lieu of a drop down menu, session selection mechanism 12 could be a field into which a terminal session identifier is input.

In any event, once a terminal session has been selected, the user can then input a command into command input field 14. The command can be any type of command that can be sent to and/or executed in a terminal session and is not intended to limit the teachings of the present invention. When the user then selects send button 15, the command will be sent to the terminal session for execution, and stored/arranged in a list or history 16 of commands. In general, list 16 includes one or more commands (e.g., q stor, q disk, q d, etc.), which were previously input by the user. Typically, the commands are maintained in a sequence such as the order in which they were input. For example, the command "q stor" could have been the first command the user input, while the command "command9" could have been the command most recently input by the user. However, this need not be the case and any sequence could be utilized in arranging the commands in list 16.

It should be understood that list 16 could be created and/or utilized in many number of ways. For example, instead of inputting each command into command input field 14, the user could generate list 16 from a previously created file. That is, if the user had previously input the commands into a form, document or the like, and then saved the same as a file, the user could use menus 27 or buttons 28 in interface 10 to open the file and/or import the commands into list 16. In another embodiment, the user could copy/cut and paste the commands from another application into list 16. In a similar fashion, the commands in list 16 could be stored in a file or the like for future use. For example, the user could save list 16 as a file, and then the next time he/she uses interface 10, the user could avoid inputting the commands again by opening the file and importing the commands therein into list 16.

Regardless, as shown, each command in list 16 has a corresponding session indicator 20 for identifying the terminal session to which the command is to be sent. As currently shown, all commands in list 16 are being sent to terminal session "A." However, it could be the case that the certain commands in the list are sent to another terminal session (e.g., terminal session "B"). In general, the session indicator 20 for a command is initially based on the terminal session that is selected via session selection mechanism 12 when the command is initially input. To this extent, it is possible for list 16 to include commands for multiple terminal sessions.

As further shown, interface 10 also includes breakpoint indicators 18 for setting breakpoints when the commands are run in a group or sequence. Specifically, instead of sending each command in list individually to a terminal session, a user can send multiple commands according to their sequence in list 16. A breakpoint will serve as a stopping point in the sequence. That is, all commands in the sequence up to (and including) the command for which a breakpoint has been set will be sent to their respective terminal session in sequence. For example, assume that the user sets breakpoint setting 18A (e.g., using breakpoint setting button 34 or a menu option) for "command6". Further assume that the user begins sending a sequence of commands to the terminal session (e.g., by selecting play button 30 or using a menu option) beginning with command "q stor". In such a case, commands will be sent to terminal session "A" in the following sequence: "q stor", "q disk", "q d", "#cp q tr", "q pf" and "command6". Once "command6" is sent (e.g., because breakpoint 18A is set), or if stop button 32 (or a similar menu option) is selected prior to "command6" being sent, the sending operation will terminate.

Figure 2:
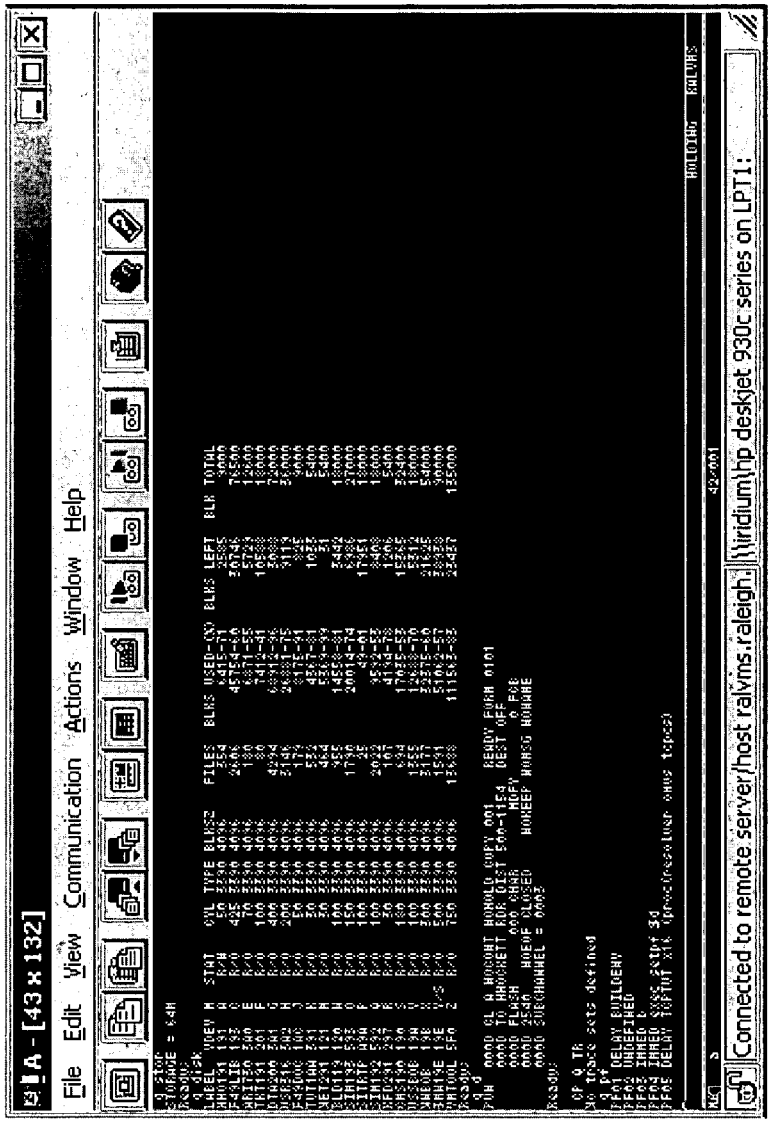
FIG. 2 shows an illustrative terminal session according to the present invention.

Referring briefly to FIG. 2, an illustrative interface 40 for terminal session "A" is shown. As can be seen, interface 40 depicts the commands "q stor", "q disk", "q d", "#cp q tr", and "q pf". Following each command (before the next command) is a set of output or results that is generated when the respective command is executed in the terminal session. For example, after command "q stor" is executed, a result of "STORAGE=64M" is generated. Based on the result, it can be presumed that the command "q stor" is a query on memory or storage.

Referring back to FIG. 1, interface 10 also provides mechanism(s) for such results. Specifically, interface 10 includes verification fields 22 for identifying results to be verified in response to the sending and execution of the commands in the terminal session. For example, for the command "q stor", verification field 22A identifies the result "64M". This means that when command "q stor" is executed in terminal session "A," a desired result of "64M" is sought. Under the present invention, verification fields 22 can be populated in any manner by the user. For example, the user could directly input a desired rule into a verification field. If the user wished to verify multiple results for a single command, the user could do so by adding a (new) row (using a button 28 or menu 27 command) below that command and inserting another result into the verification field for the new row.

As further shown, interface 10 includes verification session fields 24 for identifying the terminal sessions in which verification of the results is sought. Specifically, it could be the case that a command is sent to and executed in one terminal session (terminal session "A"), while a certain result or output is generated in another terminal session (e.g., terminal session "B"). As shown in FIG. 1, the verification terminal sessions are the same as the terminal session to which the commands are sent. However, this need not be the case. For example, if the command "q stor", when executed in terminal session "A", would cause a certain result in another terminal session "B," the user could verify that result by identifying terminal session "B" in session verification field 24A.

In any event, interface 10 also includes result indicators 26 for indicating statuses of the verification of the results. Specifically, as the commands are being executed result indicators 26 can indicate whether the verification was performed successfully, whether the verification failed, whether no verification was performed (e.g., because there was no text in the verification field), or whether the command was not yet sent. These can be indicated using different colors or indicia in result indicators 26. For example, for a successful verification, result indicators 26 could be green. For failed verification, results indicators 26 could be red or yellow with an exclamation mark. For non-verification, result indicators 26 could be black. For a command that has not yet been sent, result indicators 26 could be blank. If the user desired to clear result indicators 26, he/she could do so by selecting clear button 36 (or using a similar menu option).

Figure 3:
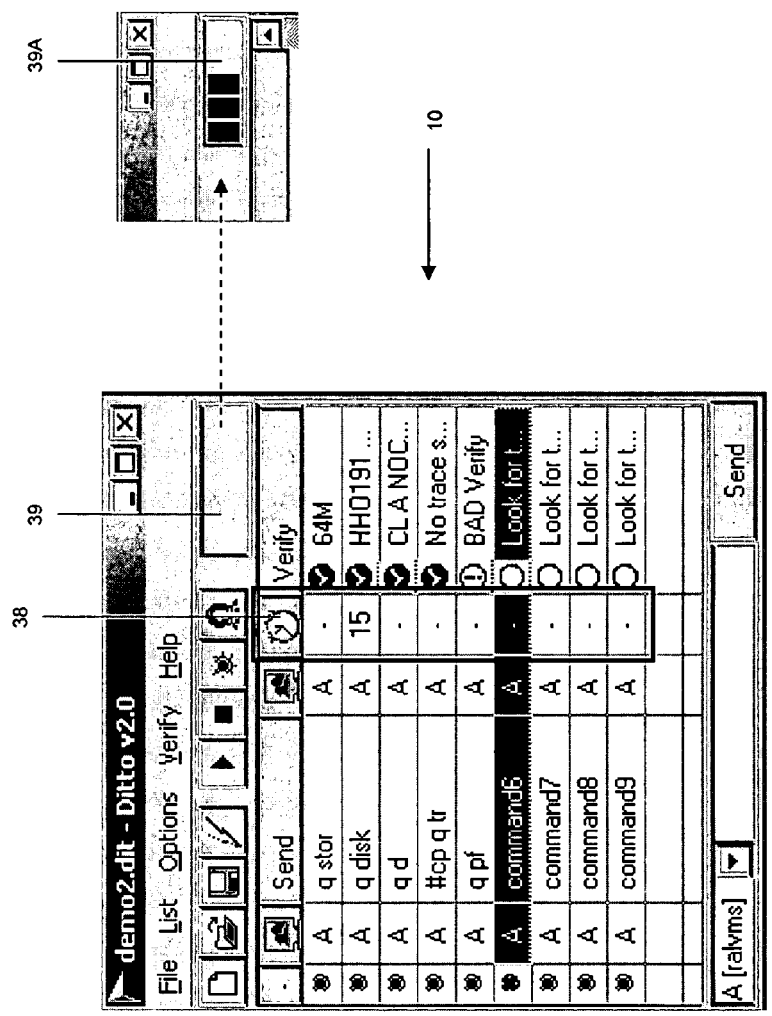
FIG. 3 shows another illustrative interface for managing commands for a terminal session according to the present invention.

In addition, as shown in FIG. 3, interface 10 could also include time-out fields 38 for indicating time-out values for verifying results and a corresponding progress bar 39. Specifically, using time-out fields 38 the user could designate a unit of time with which a result must be verified before the verification for that command is deemed to have failed. A default time-out value can be specified for all commands and/or separate time-out values could be designated. For example, a time out-value of "15 seconds" has been designated for the command "q disk." This means that once the command is sent to terminal session "A," the result of "HH0191 . . . "has to be verified within "15 seconds" or the verification operation is deemed to have failed. Progress bar 39 indicates a progress of the verification time-out process. For example, as further shown in FIG. 3, if a time-out value of "15 seconds" has been designated for the command "q disk", and progress bar 39A is approximately one-half filled, then approximately 7.5 seconds have elapsed from the time the command "q disk" was sent to terminal session "A".

It should be understood that various other features of interface 10 could be provided that have not been discussed herein in detail. For example, commands could be moved around within list 16 using cut and past techniques, drag and drop techniques, etc. Moreover, although a command for which a breakpoint has been set will be sent as part of a sequence, this need not be the case. For example, all commands prior to a command for which a breakpoint has been set could be sent as a sequence, and the send operation could terminate when the command for which the breakpoint has been set is reached. In addition, the present invention could also pass function keys and the like to a terminal session. For example, a user could press PF1-PF24 (Function keys) when interface 10 has "focus," which would cause the keystrokes to be passed through to the terminal session of the currently highlighted command. Accordingly, if command "q stor" that is destined for "A" is highlighted, then pressing PF2 will pass PF2 to terminal session "A". This allows function keys, clear screens and the like to be rapidly sent to a terminal session without having to bring the interface 10 to the "top" of the display.

Figure 4:
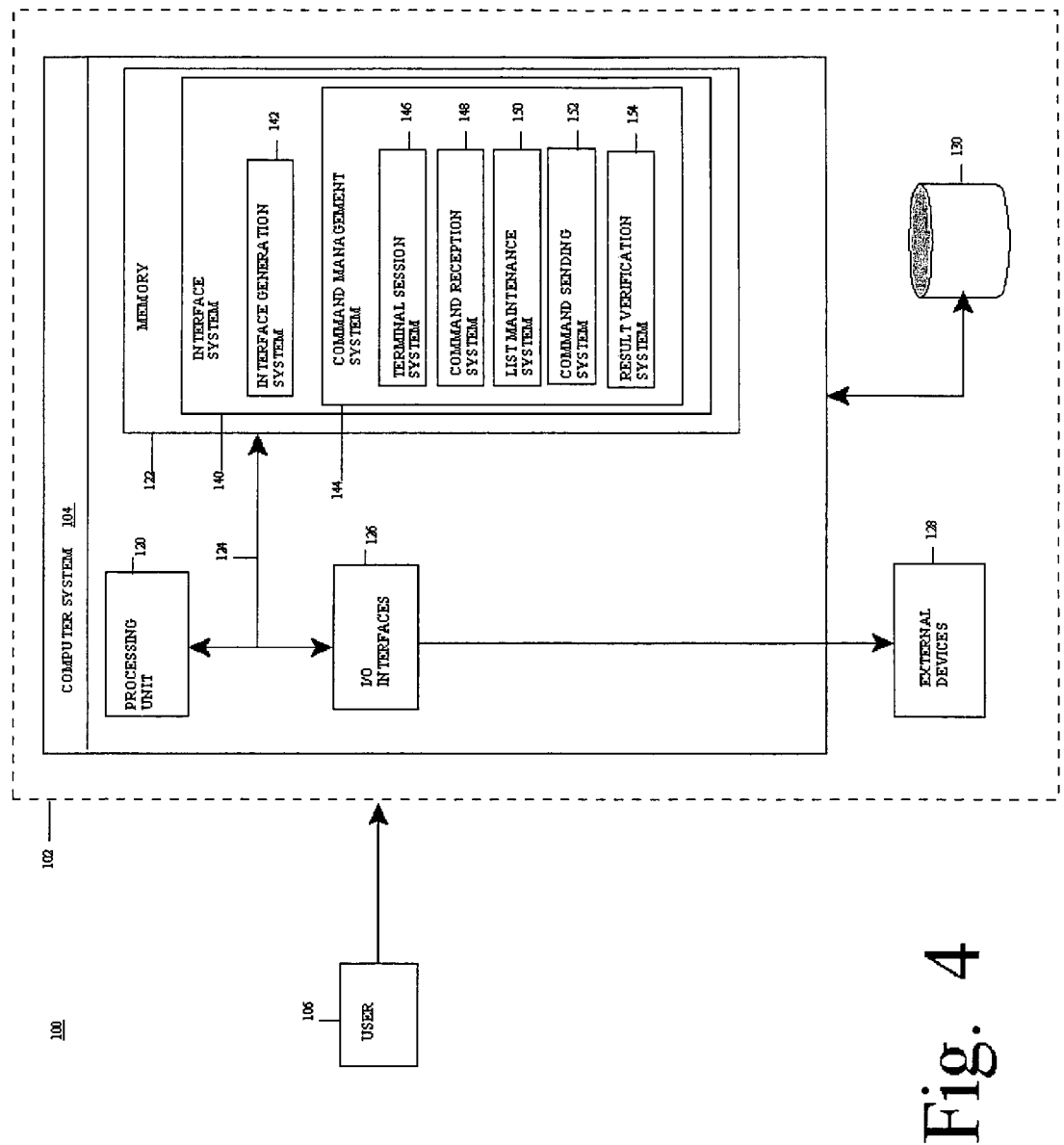
FIG. 4 shows a computerized implementation of the present invention.

Referring now to FIG. 4, a computerized implementation 100 of the present invention is shown. Specifically, FIG. 4 depicts a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to evaluate annotations.

As shown, computer system 104 includes a processing unit 120, a memory 122, a bus 124, and input/output (I/O) interfaces 126. Further, computer system 104 is shown in communication with external I/O devices/resources 128 and storage system 130. In general, processing unit 120 executes computer program code, such as interface system 140, which is stored in memory 122 and/or storage system 130. While executing computer program code, processing unit 120 can read and/or write data to/from memory 122, storage system 130, and/or I/O interfaces 126. Bus 124 provides a communication link between each of the components in computer system 104. External devices 128 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 120 may comprise a single processing unit, or be distributed across one or more processing units in one or more locations, e.g., on a client and server. Similarly, memory 122 and/or storage system 130 can comprise any combination of various types of data storage and/or transmission media that reside at one or more physical locations. Further, I/O interfaces 126 can comprise any system for exchanging information with one or more external devices 128. Still further, it is understood that one or more additional components (e.g., system software, math co-processing unit, etc.) not shown in FIG. 1 can be included in computer system 104. However, if computer system 104 comprises a handheld device or the like, it is understood that one or more external devices 128 (e.g., a display) and/or storage system(s) 130 could be contained within computer system 104, not externally as shown.

Storage system 130 can be any type of system (e.g., a database) capable of providing storage for information under the present invention such as commands, desired results, etc. To this extent, storage system 130 could include one or more storage devices, such as a magnetic disk drive or an optical disk drive. In another embodiment, storage system 130 includes data distributed across, for example, a local area network (LAN), wide area network (WAN) or a storage area network (SAN) (not shown). Although not shown, additional components, such as cache memory, communication systems, system software, etc., may be incorporated into computer system 104.

Shown in memory 122 of computer system 104 is interface system 140, which includes interface generation system 142 and command management system 144. AS further shown, command management system 144 includes terminal session system 146, command reception system 148, list maintenance system 150, command sending system 152 and result verification system 154. These systems carry out the teachings of the present invention as described above. Specifically, interface generation system 142 will generate interface 10 (FIG. 1) for user 106 to manipulate. Command management system 144 will provide and/or carry out the underlying functionality thereof.

Specifically, terminal session system 146 will receive user 106's selection of a terminal session in the interface. Command reception system 148 will receive a command for the terminal session in the interface from user 106. List maintenance system 150 will arrange the commands in the list within the interface, and provide any capability to move the commands around within the list. Command sending system 152 provides all functionality surrounding the sending of commands to terminal sessions. This includes, among other things, sending sequences of commands, setting breakpoints, sending commands until a breakpoint is reached, etc. Result verification system 154 provides the functionality discussed above in conjunction with verifying results of command executions. This included, among other things, receiving (in the interface) a result to verify in response to the execution of a command in a terminal session, indicating (in the interface) whether the result is verified when the command is executed in the terminal session; receiving a selection of another terminal session in which to verify the result; setting a time out value for verifying the result.

While shown and described herein as a method, system, and interface for managing commands for a terminal session, it is understood that the invention further provides various alternative embodiments. For example, in one embodiment, the invention provides a computer-readable medium (or computer useable medium) that includes computer program code to enable a computer infrastructure to evaluate annotations to content. To this extent, the computer-readable medium or computer useable medium includes program code that implements each of the various process steps of the invention. It is understood that the term "computer-readable medium" or "computer useable medium" comprises one or more of any type of physical embodiment of the program code. In particular, the or computer-readable medium or computer useable medium can comprise program code embodied on one or more portable storage articles of manufacture (e.g., a compact disc, a magnetic disk, a tape, etc.), on one or more data storage portions of a computing device, such as memory 122 (FIG. 4) and/or storage system 130 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage commands for a terminal session. In this case, the service provider can create, maintain, support, etc., a computer infrastructure, such as computer infrastructure 102 (FIG. 4) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing commands for a terminal session. In this case, a computer infrastructure, such as computer infrastructure 102 (FIG. 4), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for managing commands for a text-command driven terminal session, comprising:

receiving a selection of the terminal session in an interface;

receiving a text-based command for the terminal session in the interface;

arranging the command in a list within the interface;

receiving a breakpoint in the list, wherein the sending step comprises sending the plurality of commands to the terminal session in accordance with the sequence until the breakpoint is reached;

indicating, in the interface, the breakpoint in the list;

sending the command to the terminal session for execution;

receiving, in the interface, a result to verify in response to the execution of the command in the terminal session;

indicating, in the interface, whether the result is verified when the command is executed in the terminal session, wherein the indicating includes at least one of whether the verification was performed, whether the verification failed, whether no verification was performed, or whether the command was not sent; and setting a time out value for verifying the result.

2. The computer-implemented method of claim 1, wherein the list comprises a plurality of commands arranged in a sequence, and wherein the sending step comprises sending the plurality of commands to the terminal session in accordance with the sequence.

3. The computer-implemented method of claim 1, further comprising receiving a selection of another terminal session in which to verify the result.

* * * * *